United States Patent [19]

Avery

[11] 4,430,861
[45] Feb. 14, 1984

[54] OPEN CYCLE OTEC PLANT

[75] Inventor: William H. Avery, Silver Spring, Md.

[73] Assignee: The Johns Hopkins University, Baltimore, Md.

[21] Appl. No.: 384,506

[22] Filed: Jun. 3, 1982

[51] Int. Cl.³ .............................................. F03G 7/04
[52] U.S. Cl. ...................................... 60/675; 60/641.7
[58] Field of Search ................................ 60/641.7, 675

[56] References Cited

U.S. PATENT DOCUMENTS

| | | | |
|---|---|---|---|
| 2,265,878 | 12/1941 | Stoker | 60/675 |
| 3,967,449 | 7/1976 | Beck | 60/641.7 |
| 4,216,657 | 8/1980 | Ridgway | 60/641.7 |

Primary Examiner—Allen M. Ostrager
Attorney, Agent, or Firm—Robert E. Archibald; Leonard W. Pojunas, Jr.

[57] ABSTRACT

The present invention provides an open cycle ocean thermal energy conversion plant for deriving power from the thermal differential between the surface waters and cold waters at a depth in tropical oceans. Warm surface water is sprayed into a lower chamber which is at pressure approximately equal to the vapor pressure of the warm water where part of the water evaporates. The vapor then passes through a venturi or venturis dividing the lower chamber from the upper chamber which is maintained at pressure approximately equal to the vapor pressure of the cold water. The pressure difference across the venturi(s) causes the vapor to emerge into the upper chamber at supersonic speed. Cold water injected into the supersonic jets gains momentum and energy from the jets which causes it to be forced upward to the top of the chamber where it is collected. In the process the vapor is cooled and condensed by cold water. The cold water is collected and is permitted to flow downward to drive hydraulic turbines thereby providing exploitable electrical energy.

8 Claims, 3 Drawing Figures

OPEN CYCLE OTEC PLANT

STATEMENT OF GOVERNMENT INTEREST

The Government has rights in this invention pursuant to Contract No. N00024-78-C-5384, awarded by the Department of the Navy.

BACKGROUND OF THE INVENTION

The present invention is drawn to an open cycle ocean thermal energy conversion plant which derives power from the thermal difference between surface and subsurface ocean waters.

Many devices have been proposed in an attempt to utilize the thermal qualities of ocean water to obtain useful electrical power. Specifically, these devices are arranged to operate in response to the thermal differences which exist between high-temperature surface water and low-temperature deep water. These devices are generally classified as closed or open systems.

In a "closed" system, a working medium (e.g., ammonia) is cycled from a sealed reservoir which is located in cold ocean water. The medium is pumped from the reservoir to a portion of the system located in warm ocean water which vaporizes the medium. The vaporized medium continues in its path and drives a turbine or similar power generator. From the turbine the vaporized medium is directed towards the reservoir, where the cold water surrounding the reservoir condenses the medium for further use.

An "open" system utilizes sea water and its vapor as the working medium. Warm water is pumped from the surface of the ocean to a flash evaporator maintained at low pressure that vaporizes the sea water. The vaporized sea water drives a turbine as in the closed system and then proceeds to a condenser. In the open system, cold ocean water is pumped into the condenser to condense the vaporized sea water which is then delivered back to the sea. Hybrid systems have also been proposed which utilize features of the open and closed systems.

SUMMARY OF THE INVENTION

An open cycle ocean thermal energy conversion plant is proposed consisting of first and second chambers separated by an aerogrid nozzle structure or a venturi nozzle. Warm ocean water is introduced into the first chamber where it is vaporized. The vaporized water then passes through the aerogrid nozzles or venturi nozzle which accelerates the vaporized water to supersonic speed. Cold ocean water is sprayed into or mixed with the supersonic, vaporized water to condense the vaporized water in a manner which transfers part of the kinetic energy of the supersonic vapor to increase the kinetic energy of cold ocean water. The momentum transferred to the the condensed (cold) water carries it upward to a collector in the second chamber. Here, the water is collected and flows downward through a discharge tube by gravity. A hydraulic generator is located in the discharge tube and is driven by the water passing through the discharge tube. The hydraulic generator is tapped in a conventional manner to provide electrical energy.

DETAILED DESCRIPTION OF THE INVENTION

Figure 1:
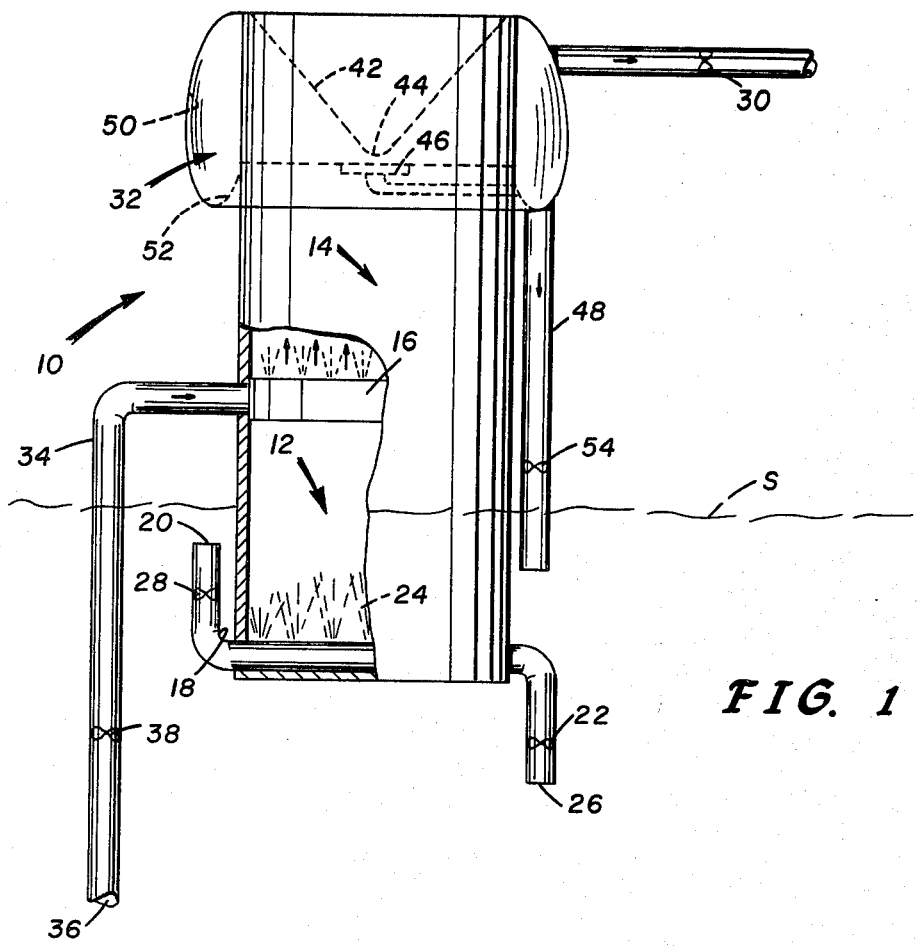
FIG. 1 shows an open cycle ocean thermal energy plant with an aerogrid nozzle structure for accelerating warm water vapor.
Figure 2:
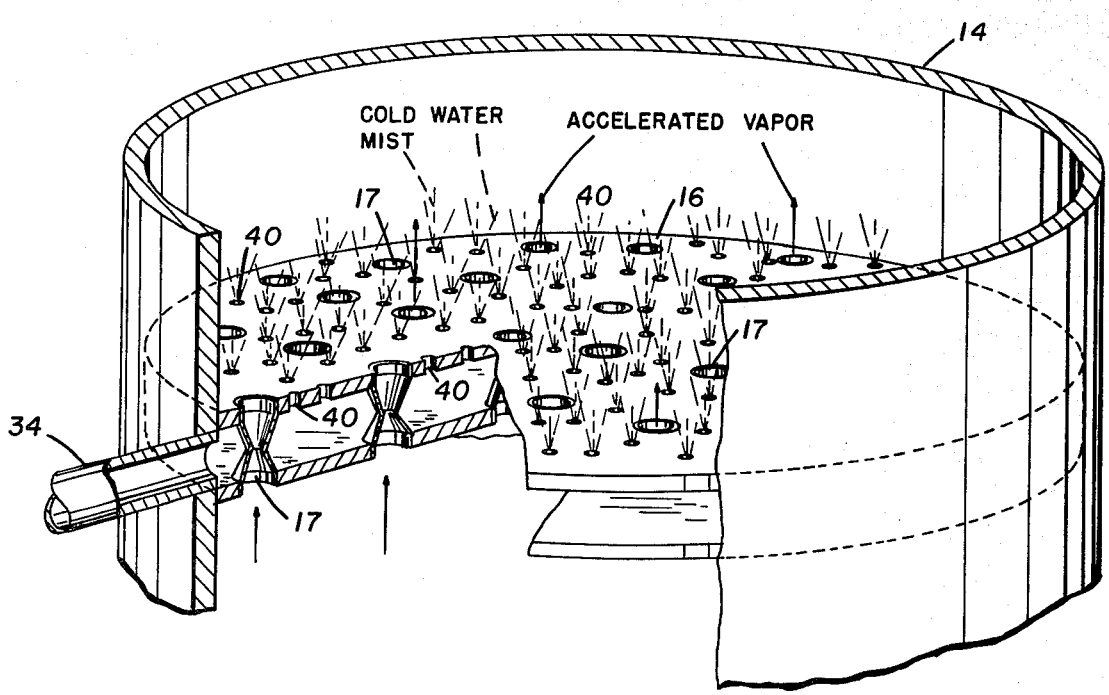
FIG. 2 is a detailed view of the aerogrid (multiple venturis) nozzle structure shown in the FIG. 1 embodiment.
Figure 3:
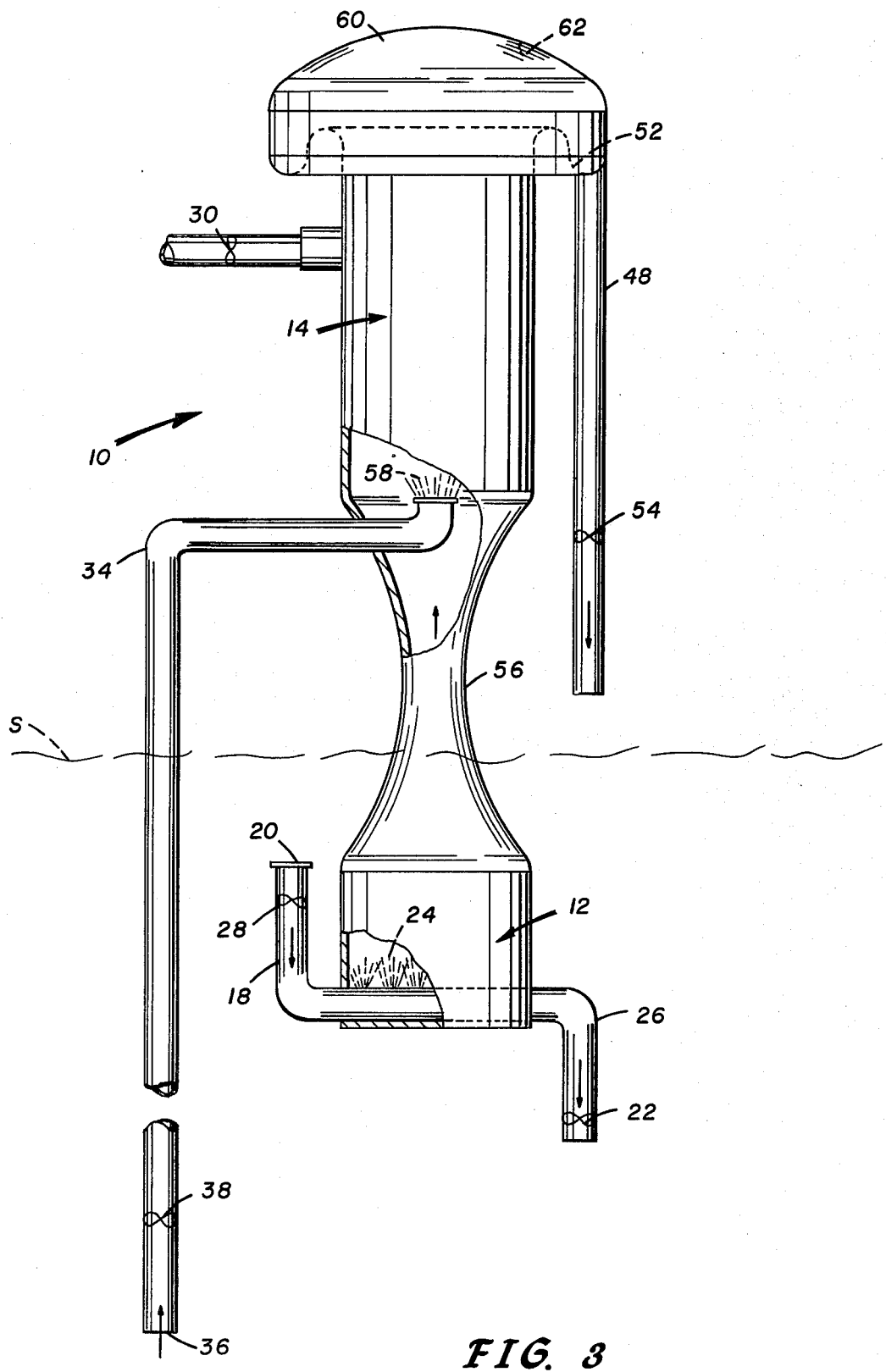
FIG. 3 shows a second embodiment of the invention with a venturi nozzle for accelerating the warm water vapor.

FIG. 1 shows an open cycle ocean thermal energy conversion plant 10, partially submerged in the sea S, including a lower chamber 12 and upper chamber 14 which are separated by a partition 16 of aerogrid nozzles 17 (see FIG. 2). A feed tube 18 is connected to the lower chamber 12, such that warm water (or other fluid) is supplied via an intake 20 to the lower chamber 12. The intake 20 is situated near the surface of the sea S to insure that warm surface waters enter the feed tube 18. The warm water is pulled through the feed tube 18 by a hydraulic pump 22. Nozzles 24 are provided in the tube 18 and inject the water passing through the tube 18 into the lower chamber 12. The lower chamber 12 is partially evacuated (discussed below) which causes flash evaporation of the water injected by the nozzles 24. Warm water that is not utilized (discussed later) by the plant 10 is discharged through an outlet 26 by the operation of pump 22. A hydraulic generator 28 may be situated in the tube 18 which is driven by the warm water pulled through tube 18 to recover a portion of the energy expended by the pump 22.

The warm water or fluid in lower chamber 12 is vaporized by actuating a vacuum pump 30 attached to the plant 10 at a collection chamber 32. Actuation of pump 30 creates a partial vacuum in the lower chamber 12, upper chamber 14, and collection chamber 32. The creation of this partial vacuum, in turn, causes a portion of the warm water in the lower chamber 12 to vaporize. The vaporized water (or other fluid) rises in the lower chamber 12 to the partition 16 of aerogrid nozzles 17. Due to the twofold pressure difference between the lower chamber and upper chamber and the shape of the aerogrid nozzles 17, the vaporized water is accelerated to supersonic velocities through the nozzles 17 into the upper chamber 14.

See FIG. 2. Cold water is supplied to the partition 16 via a tube 34 which has an inlet 36 suitably situated in ocean waters designed to draw in cold water from the depths, which is suction assisted if desired by a hydraulic pump 38. The tube 34 feeds the cold water to an arrangement of perforations 40 (see FIG. 2) in the partition 16, which disperse the cold water so that it surrounds the jets and mixes as a liquid mist or spray into the path of the accelerated water vapor. When the cold water dispersed by the perforations 40 mixes with the vaporized water accelerated through the aerogrid nozzles 16, to supersonic speed, the cold water condenses the vapor at the jet boundaries at the same time being carried upward. The vaporized water is condensed, causing an increase in kinetic energy to the cold water. The increased kinetic energy carries the cold water vertically to the collection chamber 32.

In the embodiment of FIG. 1, the collection chamber includes a conical surface 42. As the mixture of cold water and vapor in the jets moves upward, the kinetic energy of the water is converted to potential energy. At a height determined by the system design, the jets will reach a maximum height. At this height they encounter the collecting surface 42. The condensed water rises to the conical surface 42 where gravity then causes the condensed water to flow downward to one or more collection points 44 of the conical surface 42. The condensed water then drops from the apex 44 into a drain 46 which is connected to a discharge tube 48 through which the condensed water, after passing through the hydraulic generator 54, is discharged back to the sea water S. Thus, heat stored in the warm surface waters has been converted to useful energy. The collection chamber 32 also has a curved out wall 50 to aid in the collection of the condensed water. A lip-channel 52, at the base of wall 50, also guides the condensed water to the discharge tube 48. Mounted in the discharge tube 48 is a hydraulic-electrical generator 54, driven by the discharged water, which can be utilized as a primary electrical power source to drive any electrical load. The pumps 22, 30 and 38 can be connected to the hydraulic generator 54 as auxiliary loads, with ample power provided by the hydraulic generator to power a primary load.

FIG. 2 portrays a second embodiment of the present invention. The elements of FIG. 2 which correspond to the elements of FIG. 1 in structure and purpose, are numbered as in FIG. 1.

Between the lower and upper chambers 12, 14, of the FIG. 2 embodiment, is a venturi nozzle 56. More nozzles may be used to conserve space as desired. In this embodiment, the venturi nozzle 56 is the device which accelerates the warm water vapor from the lower chamber 12 to the upper chamber 14. As is generally known, if the pressure difference across the nozzle is approximately a factor of two as defined by the thermodynamic principles, a venturi nozzle accelerates a fluid which is directed through the venturi to supersonic speeds, due to a change in pressure caused by the flow of the fluid through the narrowed portion or throat of the nozzle. In the present invention, the venturi nozzle is dimensioned to accelerate the water vapor to supersonic speeds.

Downstream of the venturi nozzle 56 is a spray orifice 58 connected to a cold water intake tube 34. The spray orifice 58 sprays cold water into the water vapor after the water vapor is accelerated through the venturi nozzle 56. The water vapor then condenses as described with respect to the FIG. 1 embodiment. In this case, the collector chamber 60 is a dome with an inner surface 62 on which the condensed water collects and flows to the lip-channel 52. Other collection systems may readily be envisioned which would be suitable. The condensed water then flows through the discharge tube 48 to power the hydraulic generator 54 as in the FIG. 1 embodiment.

According to the present invention, the supersonic speed achieved by the water vapor (due to the aerogrid nozzles or venturi nozzle) and, thus, the condensed water, prevents the condensed water from falling back into the lower chamber 12. In other words, since the water vapor/condensed water is travelling at a supersonic level, a very high percentage of this mass reaches the collection chamber and is utilized. The momentum of the vapor/water mass overcomes the gravitational pull which, in prior art devices, allows condensed, and hence cold, water to fall into the warm water. In such prior art, the cold water obviously cools the warm water, which in turn inhibits further vaporization of that warm water and additional output of the power generator.

It is not necessary that the plant 10 be placed to receive surface sea water in the lower chamber 12 and deep sea water in the upper chamber 14 for the present invention to operate. The important feature is that the temperature difference between the water received by the two chambers is great enough so that there is a difference of a factor of approximately two between the vapor pressure of the cold and warm waters. The greater the difference between these temperatures, the more efficiently the plant 10 will run. For instance, if a source of warm water such as from a geothermal well or effluent from a power plant is available, the water may be warmer than surface sea water. Thus, sea water could be fed to the lower chamber 12 from the surface of the ocean, while the other source of warm water would be fed to the upper chamber 14.

The above description merely indicates the preferred embodiment of the present invention. Other variations may be realized without departing from the spirit and scope of the present invention, which is defined by the appended claims. For instance, with minor variations to the plant 10, a low power turbine may be placed in the upper chamber 14, which would be driven by the accelerated cold water.

What is claimed is:

1. An open cycle fluid thermal energy conversion apparatus which includes:
   a first chamber
   a second chamber adjacent to the first chamber
   a warm fluid supply means connected to the first chamber to provide warm fluid to the first chamber;
   a means for vaporizing the warm fluid in the first chamber into fluid vapor;
   a means disposed between said first and second chambers for using the pressure difference to accelerate to approximately supersonic speeds the fluid vapor from the first chamber to the second chamber;
   a cold fluid supply means connected to the second chamber to dispense a cold fluid into the fluid vapor to convert the momentum and kinetic energy of the fluid vapor into a condensed fluid with a potential energy of height in the second chamber;
   a power generating means connected such that the power generating means is driven by one of the aforementioned fluids to generate power;
   and a collection means connected to collect and discharge the condensed fluid.

2. An apparatus as defined in claim 1, wherein the accelerating means includes a plurality of aerogrid nozzles through which the fluid vapor is accelerated.

3. An apparatus as defined in claim 2, wherein the cold fluid supply means includes a plurality of perforations surrounding the plurality of aerogrid nozzles, and which dispense the cold fluid as a mist into the fluid vapor.

4. An apparatus as defined in claim 1, wherein the accelerating means includes at least one venturi nozzle through which the fluid vapor is accelerated.

5. An apparatus as defined in claim 4, wherein the cold fluid supply means includes a spray orifice positioned in the second chamber downstream of the venturi nozzle and which dispenses the cold fluid as a mist into the fluid vapor.

6. An apparatus as defined in claim 3 or 5, wherein the means for vaporizing includes a pump connected to the second chamber to create a partial vacuum in the first chamber.

7. An apparatus as defined in claim 6 wherein one of the aforementioned fluids is the condensed fluid, the apparatus also including a collection means having: a collector connected to the second chamber to collect the condensed fluid and convert the second kinetic energy to potential energy, and a discharge means connected to the collector through which the condensed fluid is discharged at a third kinetic energy.

8. An apparatus as defined in claim 7, wherein the discharge means comprises a tube in which the power generating means is positioned to be driven by the third kinetic energy of the condensed fluid.

* * * * *